H. F. EBERTS.
Wheel-Fenders.
No. 154,655. Patented Sept. 1, 1874.
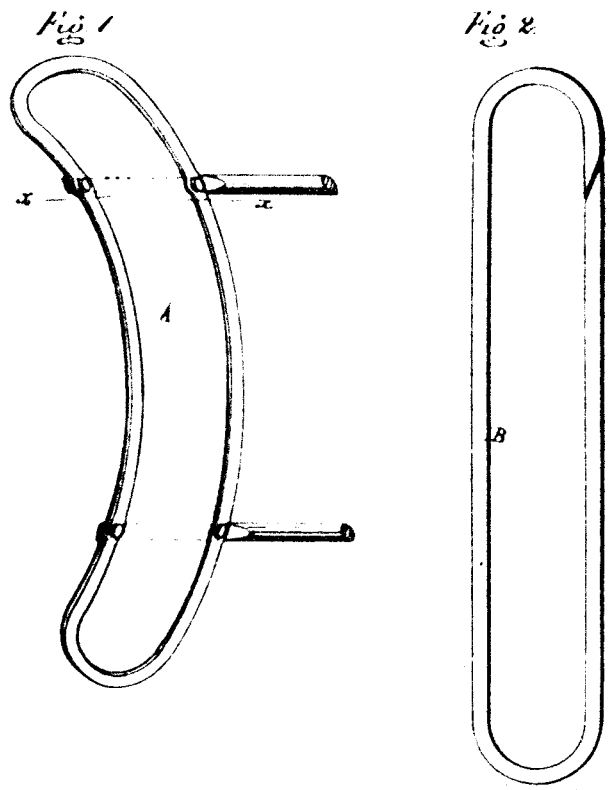

UNITED STATES PATENT OFFICE.

HERMAN F. EBERTS, OF DETROIT, MICHIGAN, ASSIGNOR TO HIMSELF AND HENRY KILEY, OF TOLEDO, OHIO.

IMPROVEMENT IN WHEEL-FENDERS.

Specification forming part of Letters Patent No. 154,655, dated September 1, 1874; application filed May 22, 1874.

*To all whom it may concern:*

Be it known that I, HERMAN FREDERICK EBERTS, of Detroit, in the county of Wayne and State of Michigan, have invented a new and useful Wheel-Fender for Vehicles, of which the following is a specification:

My invention has for its object to provide a fender for the wheels of carriages which will cost less, be more durable, be easier kept clean, and look better than the leather fender heretofore used; and it consists in making the fender of a strip of sheet metal strengthened by rolling or turning its edges over a wire border or frame, the fender being then bent over a former to the required curvature, when it may be attached to the carriage and painted any color desired.

Figure 1 is a perspective view of my improved fender. Fig. 2 is a plan of the wire frame or border. Fig. 3 is a cross-section of the fender at $x$ $x$ in Fig. 1.

In the drawing, A represents a strip of sheet-zinc or other metal, which may have parallel sides and rounded ends, or any other desired conformation. B is a heavy wire, not annealed, but stiff and elastic, and may be about three-eighths of an inch in diameter. This I bend to the shape of the strip A, and secure its ends together, by brazing, welding, or otherwise, to form a frame of less size than the said strip, whose edges I turn or roll over it with a tinman's wiring-machine, which process gives the fender the required stiffness. The fender may then be bent over a former to a segment of a circle, or to any other curvature required.

One way of securing the fender to the vehicle-irons is to flatten the wire border by hammering it where it crosses the irons under it, and drilling holes for bolts through the flattened spots, by which bolts the fender may be secured to the carriage-irons. Any other way of securing the fender to the vehicle may be employed.

The fenders may be painted and varnished to correspond with the body of the vehicle in color, and whenever the latter is repainted the fenders may be repainted also. A vehicle having leather fenders can have nothing done to renovate the latter, which make a poor contrast with the repainted vehicle unless replaced with new leather covers.

The fenders may be made very stiff by longitudinal corrugations, if desired.

What I claim as my invention, and desire to secure by Letters Patent, is—

A sheet-metal wheel-fender, A, having its edges turned or rolled around a wire strengthening-frame, B, substantially as shown and set forth.

HERMAN FREDERICK EBERTS.

Witnesses:
CHAS. J. HUNT,
CHAS. E. HUESTIS.